(12) United States Patent
Tae et al.

(10) Patent No.: US 10,877,914 B2
(45) Date of Patent: Dec. 29, 2020

(54) ELECTRONIC APPARATUS DEVICE AND CONTROL METHOD INCLUDING A HOST COMMUNICATING WITH A PLURALITY OF CONNECTORS IN A LUMP THROUGH A BUS LINE

(71) Applicant: SAMSUNG ELECTRONICS CO., LTD., Suwon-si (KR)

(72) Inventors: Kyung-hyun Tae, Suwon-si (KR); Kyoung-bo Min, Suwon-si (KR); Kab-kyun Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/477,718

(22) PCT Filed: Sep. 18, 2017

(86) PCT No.: PCT/KR2017/010163
§ 371 (c)(1),
(2) Date: Jul. 12, 2019

(87) PCT Pub. No.: WO2018/131770
PCT Pub. Date: Jul. 19, 2018

(65) Prior Publication Data
US 2019/0361830 A1 Nov. 28, 2019

(30) Foreign Application Priority Data
Jan. 13, 2017 (KR) ........................ 10-2017-0005999

(51) Int. Cl.
*G06F 13/40* (2006.01)
*G06F 1/24* (2006.01)

(52) U.S. Cl.
CPC ............ *G06F 13/4027* (2013.01); *G06F 1/24* (2013.01)

(58) Field of Classification Search
CPC ................................ G06F 13/4027; G06F 1/24
See application file for complete search history.

(56) References Cited

U.S. PATENT DOCUMENTS 9,634,726 B2 * 4/2017 Kuscher ............... H04B 5/0031
9,980,304 B2 * 5/2018 Huang .................. H04W 12/06
(Continued)

FOREIGN PATENT DOCUMENTS

KR 10-2000-0053380 8/2000
KR 10-2005-0015925 2/2005
(Continued)

OTHER PUBLICATIONS

International Search Report for PCT/KR2017/010163 dated Jan. 23, 2018, 4 pages.
(Continued)

*Primary Examiner* — Tammara R Peyton
(74) *Attorney, Agent, or Firm* — Nixon & Vanderhye, P.C.

(57) ABSTRACT

Disclosed is an electronic apparatus comprising: a plurality of connectors to which a plurality of function modules is mountable; a host device configured to make a request for information to the plurality of function modules mounted to the connector, identify suitability of the plurality of function modules according to a function and priority based on the information received from the plurality of function modules, and control the function module to perform a specific function when the function module essentially required for the specific function is fully mounted.

18 Claims, 10 Drawing Sheets

(56) References Cited

U.S. PATENT DOCUMENTS

2019/0113774 A1* 4/2019 Anderson ............ G02B 27/017
2019/0333473 A1* 10/2019 Min ........................ G09G 5/10

FOREIGN PATENT DOCUMENTS

| KR | 10-0584558 | 5/2006 |
| KR | 10-2007-0069333 | 7/2007 |
| KR | 10-2010-0021464 | 2/2010 |
| KR | 10-2012-0055661 | 5/2012 |
| KR | 10-1536069 | 7/2015 |

OTHER PUBLICATIONS

Written Opinion for PCT/KR2017/010163 dated Jan. 23, 2018, 6 pages.

* cited by examiner

| Block | Module | Priority | Module ID | | Time Slot |
|---|---|---|---|---|---|
| | | | ID1 | ID2 | |
| Audio IN | Audio Input1 | 1 | Audio IN | 1 | |
| | Audio Input2 | 2 | | 2 | |
| | ... | ... | | ... | |
| | Reserved | n-1 | | n-1 | |
| | Reserved | n | | n | |
| ADC | ADC1 | 1 | ADC | 1 | |
| | ADC2 | 2 | | 2 | |
| | ... | ... | | ... | |
| | Reserved | n-1 | | n-1 | |
| | Reserved | n | | n | 1 |
| DAC | DAC1 | 1 | DAC | 1 | 2 |
| | DAC2 | 2 | | 2 | ... |
| | ... | ... | | ... | n-1 |
| | Reserved | n-1 | | n-1 | n |
| | Reserved | n | | n | |
| AMP | AMP1 | 1 | AMP | 1 | |
| | AMP2 | 2 | | 2 | |
| | ... | ... | | ... | |
| | n-1 | n-1 | | n-1 | |
| | n | n | | n | |
| Audio OUT | Audio Output1 | 1 | Audio OUT | 1 | |
| | Audio Output2 | 2 | | 2 | |
| | ... | ... | | ... | |
| | n-1 | n-1 | | n-1 | |
| | n | n | | n | |

FIG. 9

91: THE SYSTEM CONFIGURATION DOES NOT INCLUDE THE NECESSARY FUNCTION MODULE BELOW.
- FUNCTION: AUDIO AMPLIFIER

92: THE SYSTEM CONFIGURATION DOES NOT INCLUDE THE NECESSARY FUNCTION MODULE BELOW.
- FUNCTION: AUDIO AMPLIFIER
GROUNDS OF EXCEPTION: INCOMPATIBILITY WITH HOST OR OTHER FUNCTION MODULES

93: GUIDES FOR COMPATIBLE FUNCTION MODULES
- FUNCTION: AUDIO AMPLIFIER
- MODULE INFORMATION: MODEL NAME ****, MODEL NO. ****

94: THE SYSTEM CONFIGURATION DOES NOT INCLUDE THE NECESSARY FUNCTION MODULE BELOW.
- "FIRST FUNCTION MODULE": ANALOG INPUT AMPLIFIER
- NECESSARY MODULE FUNCTION: DAC

95: THE "FIRST FUNCTION MODULE" BETWEEN THE "FIRST FUNCTION MODULE" AND THE "SECOND FUNCTION MODULE" OF THE SAME KIND WAS ADDED TO THE SYSTEM CONFIGURATION, AND THE "SECOND FUNCTION MODULE" WAS DELETED FROM THE SYSTEM CONFIGURATION.
- FUNCTION: AUDIO AMPLIFIER
GROUNDS OF SELECTION: PERFORMANCE OF THE "FIRST FUNCTION MODULE" > PERFORMANCE OF THE "SECOND FUNCTION MODULE"

ELECTRONIC APPARATUS DEVICE AND CONTROL METHOD INCLUDING A HOST COMMUNICATING WITH A PLURALITY OF CONNECTORS IN A LUMP THROUGH A BUS LINE

This application is the U.S. national phase of International Application No. PCT/KR2017/010163 filed 18 Sep. 2017, which designated the U.S. and claims priority to KR Patent Application No. 10-2017-0005999 filed 13 Jan. 2017, the entire contents of each of which are hereby incorporated by reference.

TECHNICAL FIELD

The disclosure relates to an electronic apparatus and a method of controlling the same, and more particularly to an electronic apparatus mounted with a separate function module and providing a function through the mounted function module, and a method of controlling the same.

DESCRIPTION OF RELATED ART

A video apparatus, an audio apparatus or the like electronic apparatus is externally mounted with a separately provided function module, and capable of providing a function through the function module. As an example of such a function module, there is a stand-alone function module that includes a host in itself and independently works. However, such a stand-alone function module has shortcomings that there is no choice but to use a limited number and kind of function modules because a communication line is restricted between the host of the electronic apparatus and the function module.

Further, in the stand-alone function module, the extension of the function is restricted because the function is fixed. Besides, in the stand-alone function module, a problem of compatibility may arise when a new function module unknown to the host of the electronic apparatus is mounted.

Meanwhile, a conventional electronic apparatus is inconvenient for a user because a particular situation guide is not provided when the problem of compatibility occurs when the function module is mounted.

SUMMARY

Accordingly, an aspect of the disclosure is to provide an electronic apparatus, in which restrictions on the number or kind of mountable function modules or the number of communication lines between the electronic apparatus and the function modules are relaxed, and a method of controlling the same.

Another aspect of the disclosure is to provide an electronic apparatus, in which a function extension of a mountable function module is easy, and a method of controlling the same.

Still another aspect of the disclosure is to provide an electronic apparatus, in which compatibility with a mountable function module is improved, and a method of controlling the same.

Yet another aspect of the disclosure is to provide an electronic apparatus, which is more convenient for a user even when a problem of compatibility with a mountable function module arises, and a method of controlling the same.

According to an embodiment of the disclosure, there is provided an electronic apparatus comprising: a plurality of connectors to which a plurality of function modules is mountable; a host device configured to make a request for information to the plurality of function modules mounted to the connector, identify suitability of the plurality of function modules according to a function and priority based on the information received from the plurality of function modules, and control the function module to perform a specific function when the function module essentially required for the specific function is fully mounted.

The host device transmits a reset signal to the plurality of function modules, and receives the information from the function modules in sequence after a preset period of time elapses from transmitting the reset signal.

The host device identifies that a function module having a higher version between two or more function modules different in version with regard to one function has higher priority.

The host device may receive the identification information of the function modules in sequence by a time division method.

The host device distinguishes between the function modules based on a unique frequency of a communication signal assigned to each function module.

The host device identifies the suitability based on the function and priority with reference to previously stored data.

The host device may identify the suitability based on the function and priority with reference to data received from the function module.

The host device identifies the suitability based on the function and priority with reference to data received from a server through a network.

The host device may identify the suitability based on the compatibility of the function module.

The host device may identify the compatibility between the host device and the function module, and operate using the function of the function module compatible with the host device.

The host device may identify the compatibility between the plurality of function modules, and operate using the function of two or more function modules compatible with each other.

The host device comprises a display, and controls the display to display a guide message for informing that a function module is not mounted when the function module essentially required for performing the specific function is not mounted.

The host device may identify whether the plurality of function modules mounted to the connectors corresponds to combination of the specific function modules, and operate using the function of the plurality of function modules corresponding to the combination.

The host device controls the display to display a message related to at least one among whether the host device is compatible with the function module, whether the plurality of function modules are compatible with each other, and whether a plurality of mounted function modules corresponds to combination of specific function modules.

The electronic apparatus further comprising a bus line shared between the host device and the plurality of function modules mounted to the connectors, wherein the host device makes a request for the information to the plurality of function modules in a lump through the bus line.

The host device further comprises a communication line for exchanging data with the function module to perform the specific function.

According to another embodiment of the disclosure, there is provided a method of controlling an electronic apparatus, comprising: making a request for information to a plurality of function modules mounted to the electronic apparatus; identifying suitability of the plurality of function modules according to a function and priority based on the information received from the plurality of function modules; and controlling the function module to perform a specific function when the function module essentially required for the specific function is fully mounted.

The method further comprising: transmitting a reset signal to the plurality of function modules; and receiving the information from the function modules in sequence after a preset period of time elapses from transmitting the reset signal.

The identifying of the suitability comprises identifying that a function module having a higher version between two or more function modules different in version with regard to one function has higher priority.

The receiving may include receiving the identification information of the function modules in sequence by a time division method.

The method further comprising distinguishing between the function modules based on a unique frequency of a communication signal assigned to each function module. The unique attribute of the communication signal may include a frequency.

The identifying of the suitability comprises identifying the suitability based on the function and priority with reference to previously stored data.

The identifying of the suitability may include identifying the suitability based on the function and priority with reference to data received from the function module.

The identifying of the suitability comprises identifying the suitability based on the function and priority with reference to data received from a server through a network.

The identifying of the suitability may include identifying the suitability based on the compatibility of the function module.

The control method of the electronic apparatus may include identifying the compatibility between the electronic apparatus and the function module, and operating using the function of the function module compatible with the electronic apparatus.

The control method of the electronic apparatus may include identifying the compatibility between the plurality of function modules, and operating using the function of two or more function modules compatible with each other.

The method further comprising displaying a guide message for informing that a function module is not mounted when the function module essentially required for performing the specific function is not mounted.

The control method of the electronic apparatus may include identifying whether the plurality of function modules mounted to the connectors corresponds to combination of the specific function modules, and operating using the function of the plurality of function modules corresponding to the combination.

The method further comprising displaying a message related to at least one among whether the host device is compatible with the function module, whether the plurality of function modules are compatible with each other, and whether a plurality of mounted function modules corresponds to combination of specific function modules.

The making of the request for the information comprises making a request for the information to the plurality of function modules in a lump through a bus line shared between the electronic apparatus and the plurality of function modules.

A computer-readable recording medium stored with a program to be executed by an electronic apparatus, a c program control method comprising: making a request for information to a plurality of function modules mounted to the electronic apparatus; identifying suitability of the plurality of function modules according to a function and priority based on the information received from the plurality of function modules; and controlling the function module to perform a specific function when the function module essentially required for the specific function is fully mounted.

As described above, according to the disclosure, restrictions on the number or kind of mountable function modules or the number of communication lines between the electronic apparatus and the function modules are relaxed.

According to the disclosure, a function extension of a mountable function module is easy, According to the disclosure, compatibility with a mountable function module is improved.

According to the disclosure, it is more convenient for a user even when a problem of compatibility with a mountable function module arises.

BRIEF DESCRIPTION OF THE DRAWINGS

FIG. 8 illustrates an example of a table showing suitability reference information according to an embodiment of the disclosure, FIG. 9 illustrates an example of suitability-identification result guide information according to an embodiment of the disclosure.

DETAILED DESCRIPTION OF EXAMPLE EMBODIMENTS

Below, embodiments of the disclosure will be described in detail with reference to accompanying drawings. In the following descriptions of the embodiments, the matters illustrated in the accompanying drawings will be referred, and like numerals or symbols will refer to like elements substantially the same functions.

Figure 1:
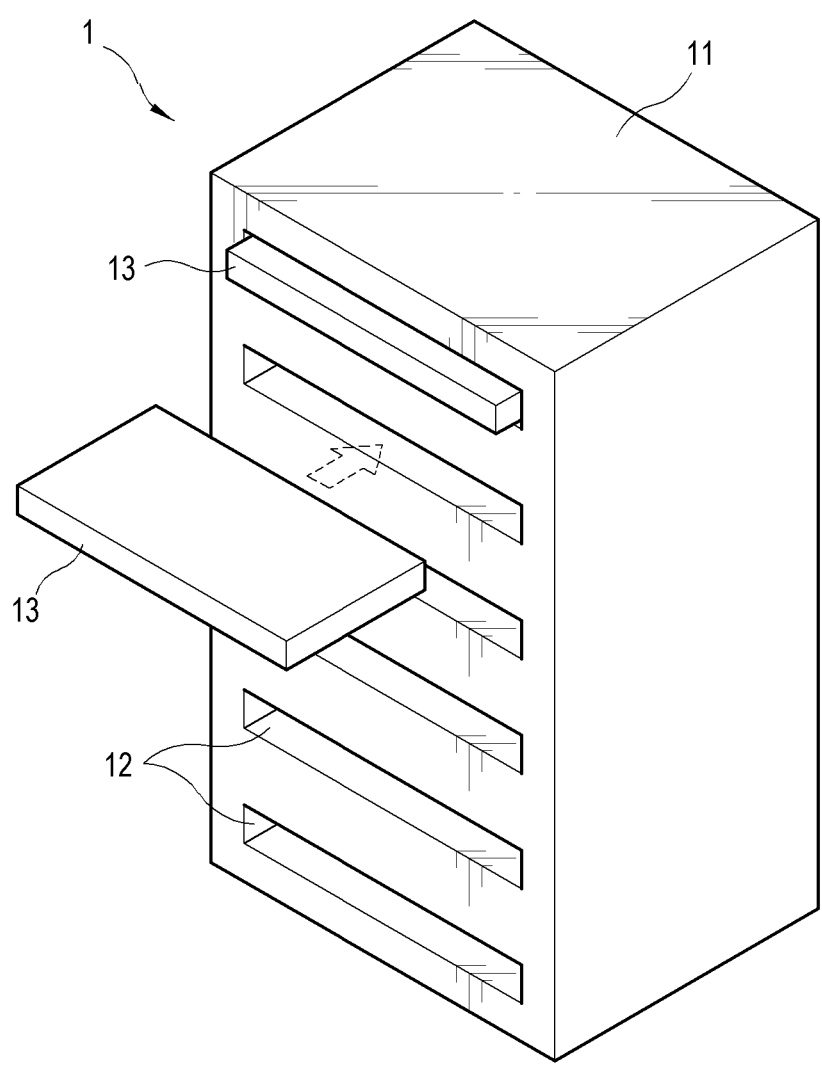
FIG. 1 illustrates an electronic apparatus according to an embodiment of the disclosure.

FIG. 1 illustrates an electronic apparatus according to an embodiment of the disclosure. The electronic apparatus 1 according to an embodiment of the disclosure may be actualized by various products. Specifically, the electronic apparatus 1 according to an embodiment of the disclosure may be actualized by a video/audio/multimedia device, a communication device, home appliances, a personal terminal, a computer system, a wearable device, a virtual reality device, etc. without limiting the purpose of use, and may for example include a TV, a smartphone, a tablet computer, a mobile phone, a computer, a multimedia player, a set-top box, a digital versatile disc (DVD) player, a Blu-ray disc (BD) player, an MP3 player, a radio device, an audio/video (A/V) receiver, a loudspeaker, a car audio system, an electronic frame, a digital billboard, a large format display, a signage, a smartwatch, a head-mountable display, etc.

As shown in FIG. 1, an electronic apparatus 1 according to an embodiment of the disclosure includes a casing 11, and a plurality of slots 12. The casing 11 forms an outer appearance of the electronic apparatus 1, and internally includes a host device (see '21' in FIG. 2) of the electronic apparatus 1. FIG. 1 shows the hexahedral casing 11, but this is merely an example. The casing 11 may have various shapes, such as other polyhedrons, a spherical shape, an oval shape, etc. A function module 13 is mounted to each slot 12 of the electronic apparatus 1. Each slot 12 has an inner shape corresponding to the outer shape of the function module 13 so as to insert the function module 13 therein. FIG. 1 shows the hexahedral function module 13 shaped like a flat plate, but this is merely an example. The function module 13 may have various shapes, sizes, etc. The number of slots 12 is not limited to that shown in FIG. 1, and the electronic apparatus 1 may have various numbers of slots 12.

Each function module 13 is inserted in and mounted to the slot 12 and connected to the host device (see '21' in FIG. 2) of the electronic apparatus 1. Each function module 13 may stop connecting with the host device (see '21' in FIG. 2) of the electronic apparatus 1, and separate from the electronic apparatus 1 as pulled out from the slot 12. Connection between the host device (see '21' in FIG. 2) of the electronic apparatus 1 and the function module 13 may be achieved by coupling between connectors provided in the host device (see '21' in FIG. 2) of the electronic apparatus 1 and the function module 13. FIG. 1 shows the slot 12 as a method of mounting the function module 13 to the electronic apparatus 1, but this is merely an example and not limited to this example. For example, instead of the slot 12, the connector of the host device in an electronic apparatus according to another embodiment of the disclosure may be exposed to the outside and the connector of the function module may be coupled to the connector of the host device, thereby mounting the function module to the electronic apparatus.

Figure 2:
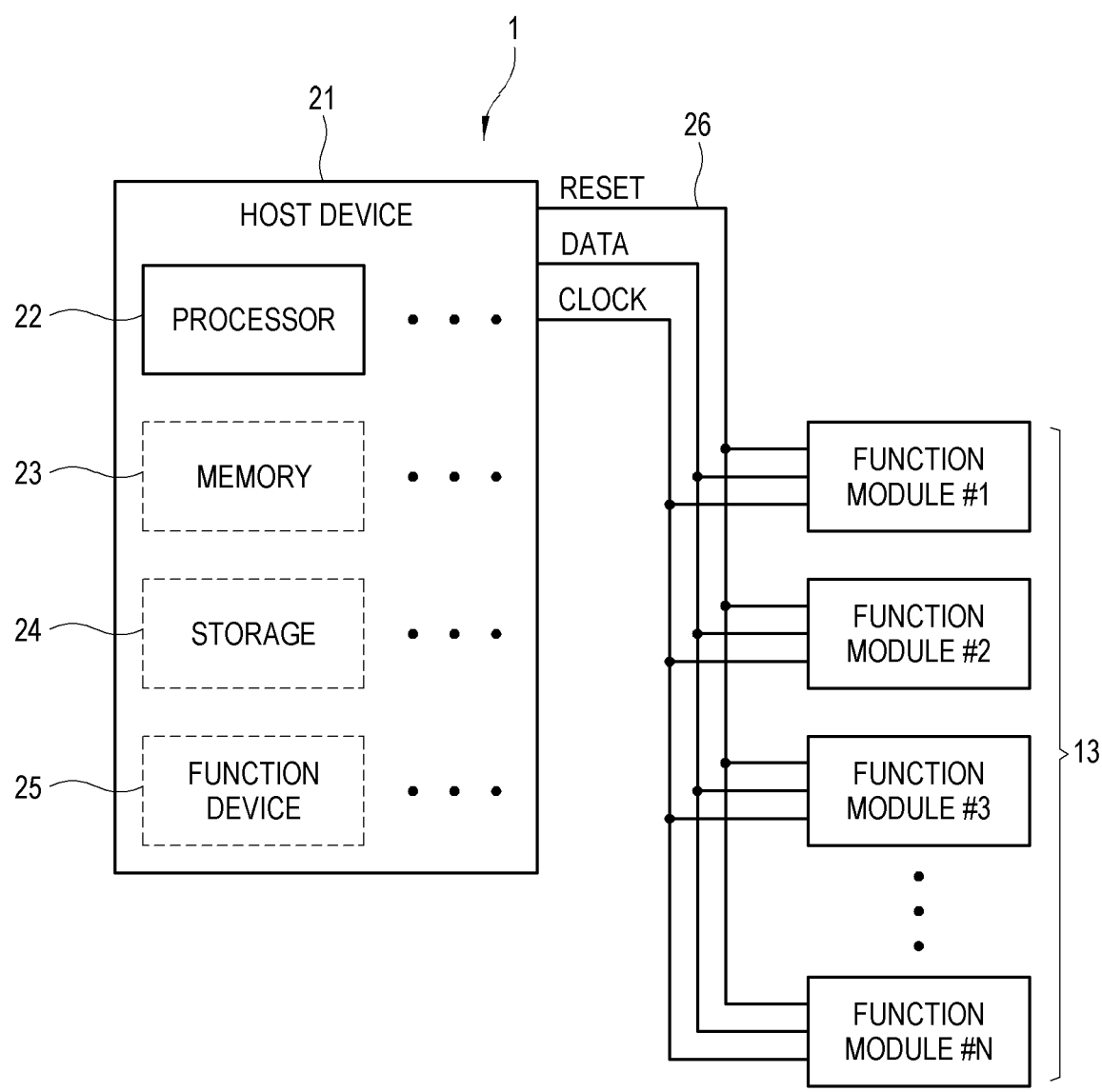
FIG. 2 is a block diagram of an electronic apparatus according to an embodiment of the disclosure.

FIG. 2 is a block diagram of the electronic apparatus according to an embodiment of the disclosure. As shown in FIG. 1, the electronic apparatus 1 includes the host device 21. The host device 21, as described with reference to FIG. 1, connects with a plurality of function module #1, function module #2, function module #3, . . . , function module #N (13; hereinafter also referred to as the 'function module'). The host device 21, as shown in FIG. 2, includes at least one processor 22. The processor 22 executes a program for performing operation of the host device 21. The program may be actualized in at least one form among a basic input/output system (BIOS), a device driver, an operating system, a firmware, a platform, and an application program (or application.

The host device 21 according to an alternative embodiment may further include at least one of a memory 23 and a storage 24. The memory 23 may be actualized by a random-access memory (RAM), and configured to temporarily load at least a part of the program of the processor 22. The storage 24 may be actualized by a hard disk drive, a flash memory, etc., and configured to store or install the program to be loaded to the memory 23. The application program may be previously installed or stored in the storage 24 when the electronic apparatus 1 is manufactured, or may be installed in the storage 24 based on data received from the outside when used in the future. The data of the application program may for example be downloaded from an external server such as an application market.

The host device 21, according to an alternative embodiment, may further include at least one function device 25. Each function device 25 performs a certain function needed for operation of the electronic apparatus 1. The function device 25 includes a signal transceiving device, a signal processing device, an output device, a communication device, a user input device, an information collection device, etc. The signal transceiving device receives a signal from the outside or transmits a signal to the outside. The signal transmitted and received by the signal transceiving device includes a video signal, an audio signal, and a data signal. The signal transceiving device may receive a signal such as a broadcast signal like a TV.

The signal processing device processes a signal received by the signal transceiving device or a signal to be transmitted through the signal transceiving device. The signal process performed by the signal processing device includes a video process and an audio process. The video process performed by the signal processing device includes demultiplexing, deinterlacing for conversion of an interlaced type video signal into a progressing type signal, scaling for changing a resolution of a video signal, noise reduction for improving image quality, detail enhancement, frame refresh rate conversion, etc. The audio process performed by the signal processing device includes separation or mergence for an audio channel; separation, filtering or change for a frequency component; change or compensation for a sound image; improvement of sound quality; cross-talk canceling; audio-level amplification, etc.

The output device includes a display to display an image, and a loudspeaker to output a sound. The display may for example include various display types such as liquid crystal, plasma, a light-emitting diode, an organic light-emitting diode, a surface-conduction electron-emitter, a carbon nanotube, nano-crystal, etc. The loudspeaker may include at least one of a sub-woofer, a mid-woofer, a mid-range loudspeaker, and a twitter loudspeaker according to frequency bands of an output sound.

The communication device performs communication with an external apparatus. The communication performed by the communication device includes wired communication and/or wireless communication. The communication performed by the communication device includes direct communication with the external apparatus, or indirect communication using a network. The user input device receives a user's input. The user input device may for example include a menu button provided in the electronic apparatus 1, a remote control signal receiver to receive a remote control signal corresponding to a user's input from a remote controller, a touch screen provided in the display to receive a user's touch input, a camera to detect a user's gesture input, a microphone to receive a user's voice input, etc. The information collection device collects information about the states or surrounding environments of the electronic apparatus 1. The information collection device may for example include a temperature sensor, a pressure sensor, a humidity sensor, an altitude sensor, an acceleration sensor, a tilting sensor, etc.

Referring back to FIG. 2, the host device 21 of the electronic apparatus 1 connects with a plurality of function modules 13 through the communication line 26. The connectors provided at the host device 21 and each function module 13 have a plurality of terminals corresponding to the communication line 26. The communication line 26 may for example include a reset signal line RESET to transmit a reset signal, a data signal line DATA to transmit a data signal, and a clock signal line CLOCK to transmit a clock signal. The communication line 26 may include a bus line shared between the host device 21 and the plurality of function modules 13. The number of communication lines 26 shown in FIG. 2, and the kind of signal to be transmitted are merely an example, and there are no limits to a connection method between the host device 21 and each function module 13. Each function module 13 may include a function device to perform a function of a corresponding module, a communication device to perform communication with the host device 21 through the communication line 26, and a processor to control general operation of the corresponding module.

Figure 3:
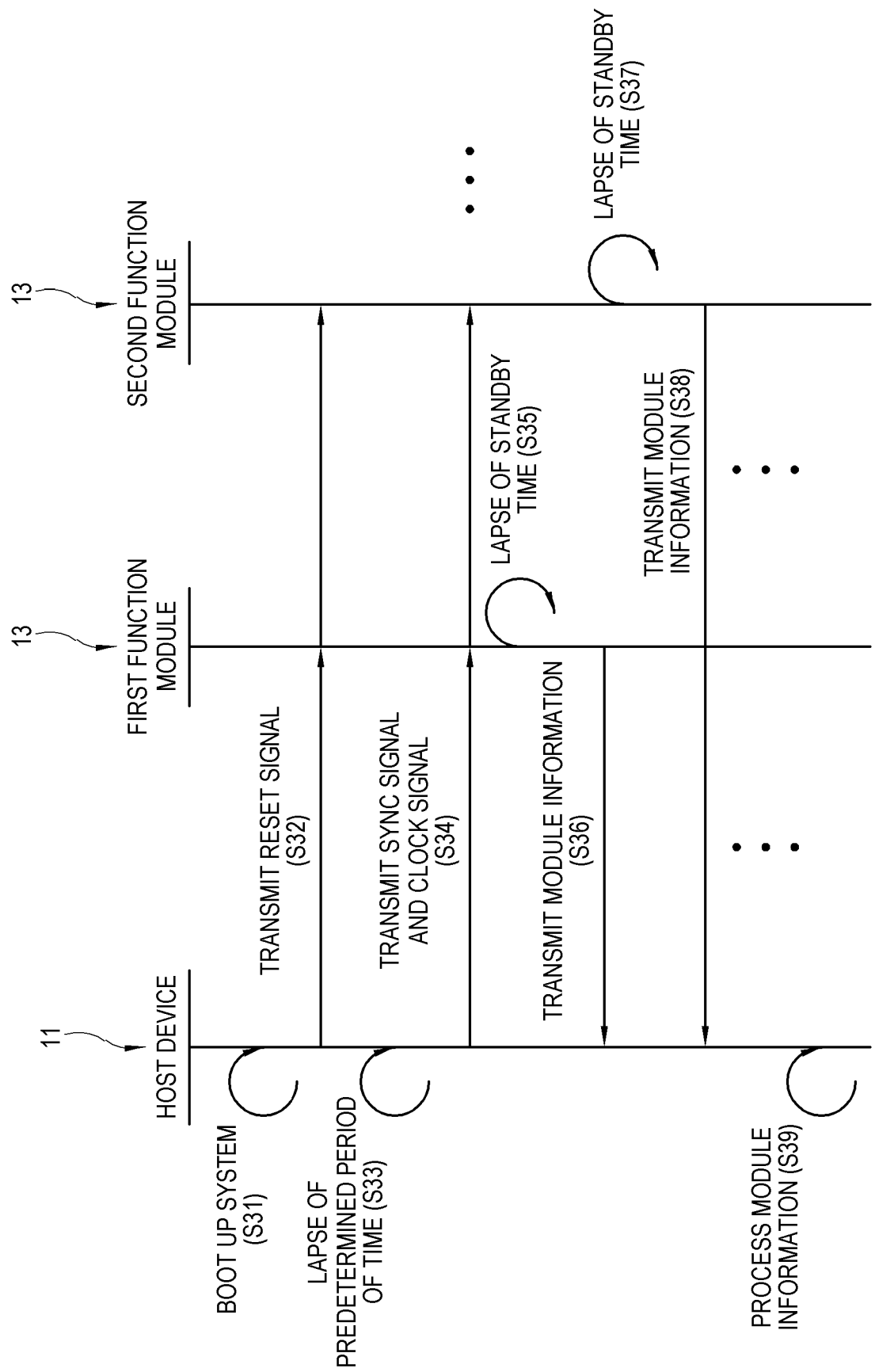
FIG. 3 illustrates an example of an electronic apparatus according to an embodiment of the disclosure.

FIG. 3 illustrates an example of operation in an electronic apparatus according to an embodiment of the disclosure. First, at operation S31 of FIG. 3, the host device 21 of the electronic apparatus 1 boots up a system. The host device 21 may boot up the system when newly powered on or in response to a user's input. Next, at operation S32, the host device 21 transmits the reset signal to the plurality of function modules 13 mounted to the electronic apparatus 1. The host device 21 may transmit the reset signal when a condition for identifying whether the mounted function module 13 is suitable (hereinafter, referred to as a 'suitability identification condition') is satisfied. As an example of the suitability identification condition, FIG. 3 shows that the host device 21 transmits the reset signal to the function module 13 when the system is booted up. However, FIG. 3 is merely an example, and the suitability identification condition of the disclosure is not limited to this example. For example, the host device 21 may transmit the reset signal to the plurality of function modules 13 when a certain function module 13 is newly mounted to the electronic apparatus 1. Alternatively, the host device 21 may transmit the reset signal to the plurality of function modules 13 when a user's input is made.

Figure 4:
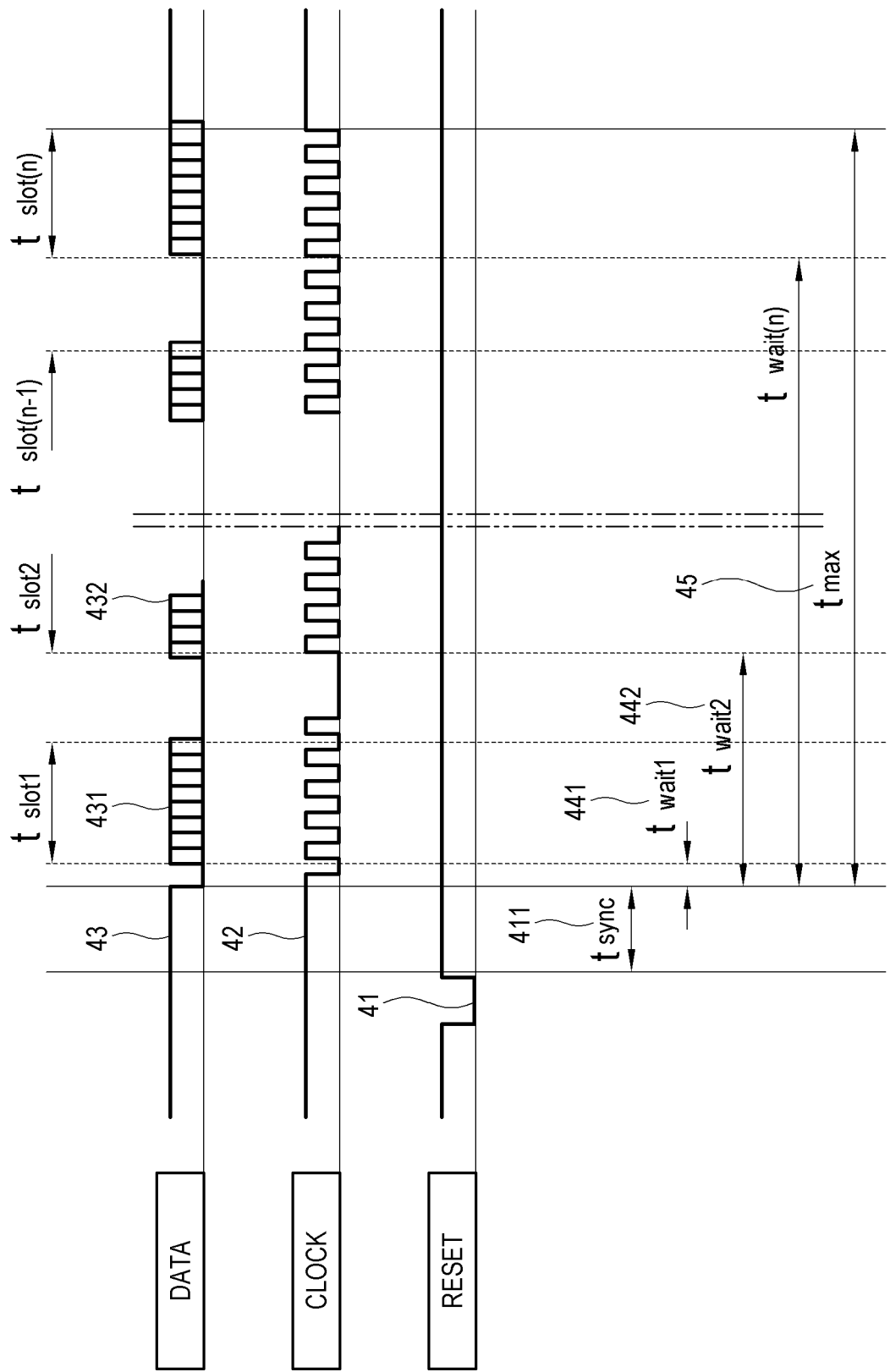
FIG. 4 illustrates an example of a signal transmitted and received between a function module and an electronic apparatus according to an embodiment of the disclosure.

FIG. 4 illustrates an example of a signal transmitted and received between the function module 13 and the electronic apparatus 1 according to an embodiment of the disclosure. The host device 21 of the electronic apparatus 1 transmits a reset signal 41 having a waveform as shown in FIG. 4 to the plurality of function modules 13 through the reset signal line RESET. According to an embodiment of the disclosure, the reset signal 41 refers to an example of a signal by which the host device 21 makes a request for module information to the plurality of function modules 13. The host device 21 transmits the reset signal 41 to each function module 13 through the bus line 26, thereby making a request for the module information to the plurality of function modules 13 in a lump. When receiving the reset signal 41, each function module 13 becomes ready for receiving a subsequent signal from the host device 21. For example, each function module 13 may be individually booted up in response to the reception of the reset signal 41. Referring back to FIG. 3, at operation S33, the host device 21 identifies whether a predetermined period of time elapses after transmitting the reset signal 41. The predetermined period of time may for example be time about $t_{sync}$ 411 as shown in FIG. 4. $t_{sync}$ 411 may correspond to a booting time of each function module 13.

After the predetermined period of time 411 elapses, at operation 34 of FIG. 3, the host device 21 transmits a sync signal and a clock signal to the plurality of function modules 13 through the communication line 26. The host device 21 may for example transmit a sync signal 43 and a clock signal 42, waveforms of which are as shown in FIG. 4, to the data signal line DATA and the clock signal line CLOCK. The plurality of function modules 13 are synchronized with one another with respect to the sync signal 43 of the data signal line DATA. According to an embodiment of the disclosure, each of the plurality of function modules 13 transmits information about its own module (hereinafter, referred to as 'module information') to the host device 21 in a certain section which is not overlapped with another section by a time division method.

Referring back to FIG. 3, at operation S35, a first function module 13 among the plurality of function modules identifies whether unique standby time given thereto elapses after receiving the sync signal 43. After the standby time elapses, at operation S36 the first function module 13 transmits its own module information to the host device 21. Meanwhile, when unique standby time given to a second function module 13 among the plurality of function modules elapses after receiving the sync signal 43 (S37), the second function module 13 transmits its own module information to the host device 21 (S38). Likewise, the other function modules 13 also transmits their own module information to the host device 21 in sequence after unique standby time given thereto elapses. Each function module 13 may previously store information about its own unique standby time.

Referring to FIG. 4, each function module 13 transmits its own module information to the host device 21 through the data signal line DATA in the section 431, 432, etc. assigned thereto. That is, the first function module 13 transmits the module information to the host device 21 during its own transmission section 431 from time when unique standby time 441 assigned thereto elapses after receiving the sync signal 43. Further, the second function module 13 transmits the module information to the host device 21 during its own transmission section 432 from time when unique standby time 442 assigned thereto elapses after receiving the sync signal 43. Therefore, the host device 21 receives the module information from the function modules 13 in sequence at a point of time when the standby time 442 of each function module 13 elapses after transmitting the reset signal 41.

Referring back to FIG. 3, at operation S39, the host device 21 performs processing with regard to the received module information when the module information is received from all the function modules. The host device 21 may identify that a procedure of receiving the module information from the function module 13 is terminated, based on a lapse of a maximum standby time (see '45' in FIG. 4) obtained by adding up the standby time of all the function modules 13. The host device 21 may perform the whole operation again from the operation S32 of transmitting the reset signal, when something is wrong with the procedure of receiving the module information from each function module 13. Therefore, restrictions on the number or kind of mountable function modules 13 or the number of communication lines are relaxed because it is possible to distinguish among the plurality of function modules 13 by a simplified communication method.

Figure 6:
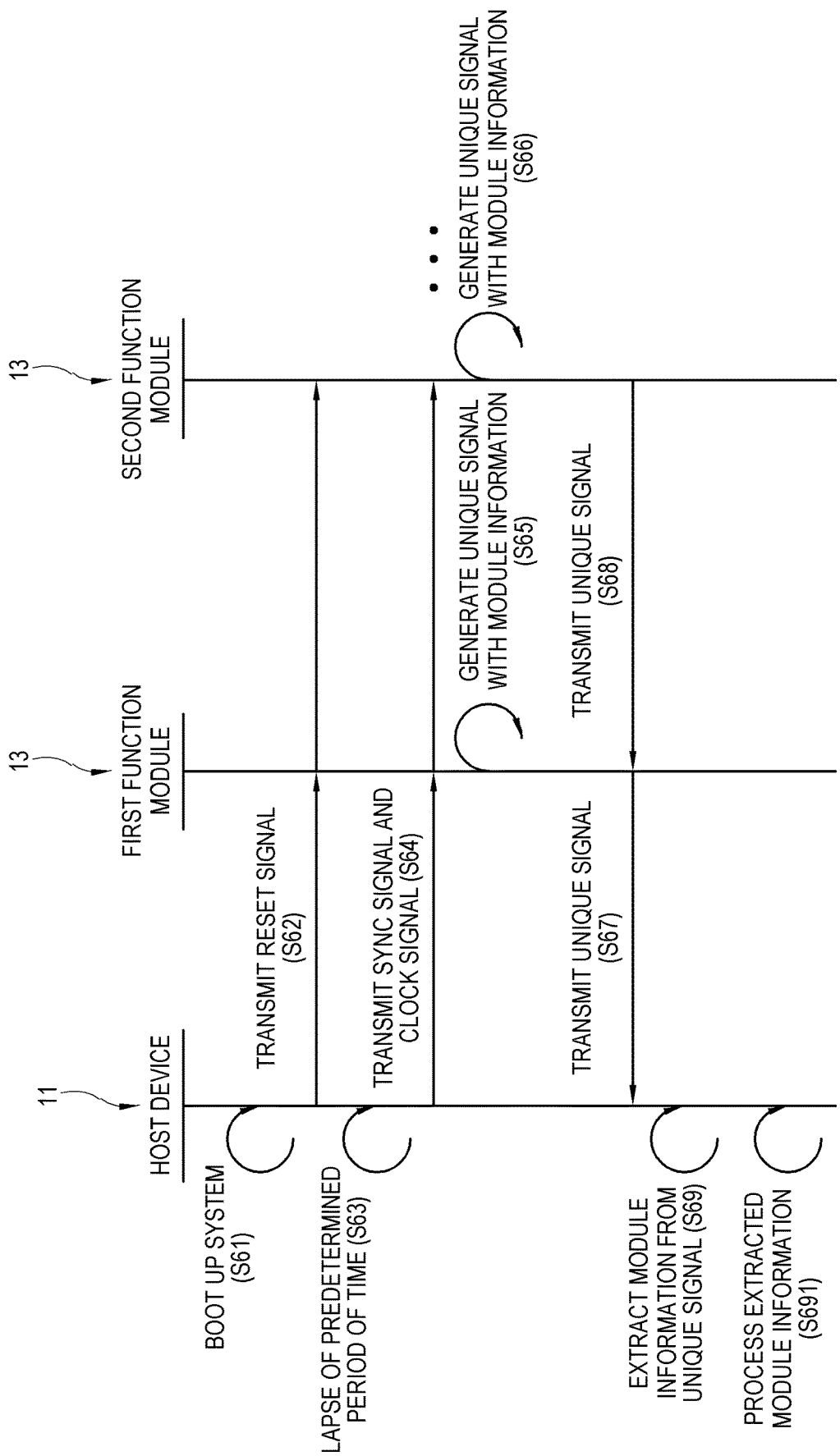
FIG. 6 illustrates another example of operation of an electronic apparatus according to an embodiment of the disclosure.

FIGS. 3 and 4 show an example of receiving the module information from the function module 13 by the time division method, but this is merely an example and the disclosure is not limited to this example. FIG. 6 illustrates another example of operation of the electronic apparatus 1 according to an embodiment of the disclosure. Regarding the electronic apparatus 1 shown in FIG. 6, repetitive descriptions to the same or similar configuration of the electronic apparatus 1 described with reference to FIGS. 3 and 4 will be avoided. First, operation S61 to S64 of FIG. 6 is the same as that S31 to S34 of FIG. 3. Next, at operation S65, S66, etc., each function module 13 generates a signal having its own attribute assigned thereto (hereinafter, referred to as a 'unique signal') as a signal including its own module information. The attribute of the unique signal makes it possible to distinguish among a plurality of signals, and may for example include a level, a waveform, a frequency, a phase, etc. of the signal. Next, at operation S67, S68, etc., each function module 13 transmits the unique signal including its own module information to the host device 21. The function modules 13 may transmit the unique signal to the host device 21 at the same or different points of time.

Next, at operation S69, the host device 21 distinguishes among the plurality of unique signals based on the different attributes of the received unique signals, and extracts the module information of each function module 13 from each unique signal. For example, the host device 21 may distinguish among the plurality of unique signals based on the different frequencies of the unique signals. Next, at operation S691, the host device 21 processes the extracted module information of each function module 13.

Figure 5:
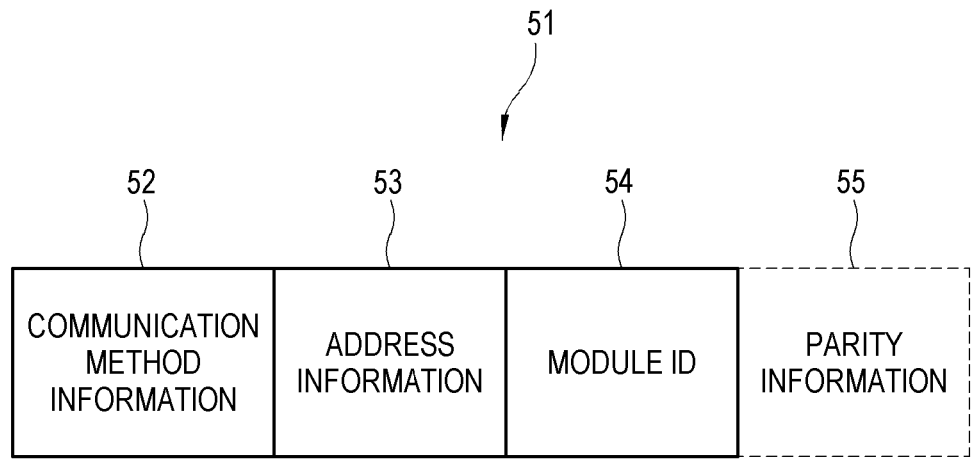
FIG. 5 illustrates an example of module information according to an embodiment of the disclosure.

The host device 21 may identify each function module 13 based on the module information received from each function module 13. FIG. 5 illustrates an example of the module information according to an embodiment of the disclosure. As shown in FIG. 5, module information 51 according to an embodiment of the disclosure is given in the form of packet data. The module information 51 includes communication method information 52, address information 53 and module ID 54. The communication method information 52 indicates a method of communicating with the host device 21, which will be used when the function module 13 operates. The communication method may for example include I$_2$C, universal asynchronous receiver-transmitter (UART), parallel communication, etc. The address information 53 indicates a communication address for specifying the function module 13 when the communication is made based on the corresponding communication method. However, this is merely an example, and the disclosure is not limited to this example. The module ID 54 indicates unique ID for distinguishing the corresponding function module 13 from the other function modules. According to an embodiment of the disclosure, the module information 51 may further include parity information. The host device 21 may identify whether an error is present in the corresponding module information 51, based on the parity information.

Figure 7:
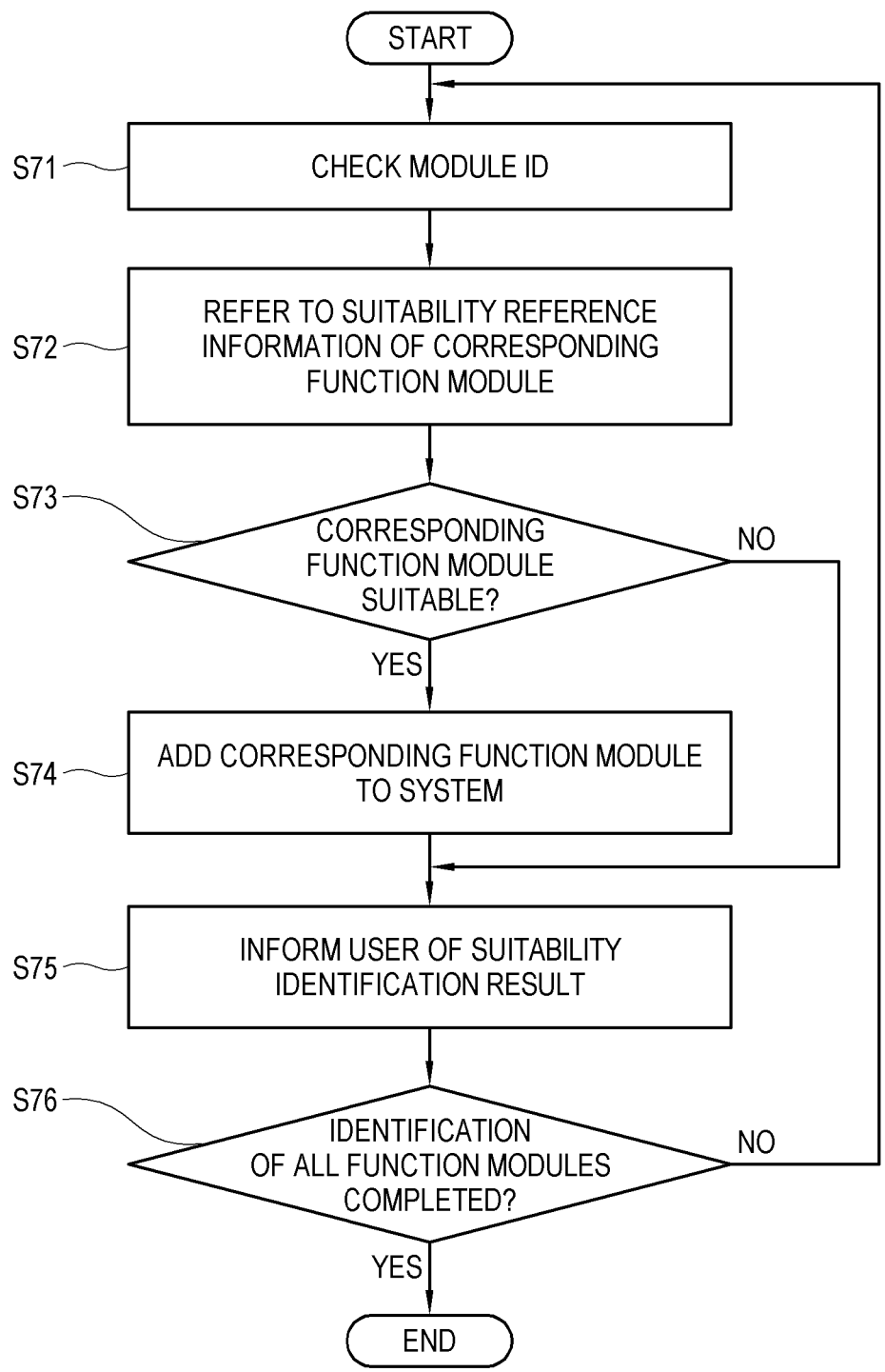
FIG. 7 is a flowchart showing an example of an electronic apparatus 1 according to an embodiment of the disclosure.

FIG. 7 is a flowchart showing an example of the electronic apparatus 1 according to an embodiment of the disclosure. First, at operation S71, the host device 21 identifies the module ID of the function module 13 based on the module information of the corresponding function module 13. Next, at operation S72, the host device 21 refers to information (hereinafter, referred to as 'suitability reference information') for identifying whether the function module 13 is suitable, based on the identified module ID. According to an embodiment of the disclosure, the suitability reference information may be actualized in the form of a table.

FIG. 8 illustrates an example of a table showing suitability reference information according to an embodiment of the disclosure. As shown in FIG. 8, a table 81 shows the suitability reference information of each function module 13 according to the module ID "Module ID". The table 81 sorts the plurality of same or similar function modules 13 in units of block "Block". The block "Block" may for example includes an audio input module "Audio IN", an analog-to-digital conversion module "ADC", a digital-to-analog conversion module "DAC", an audio amplification module "AMP", and an audio output module "Audio OUT". In this case, the module ID "Module ID" is divided into block ID "ID1", and individual module ID "ID2". Further, the table 81 contains information Module for describing the function of the function module 13 corresponding to each module ID "Module ID". The function module 13 in the table 81 shown in FIG. 8 is an audio device, but the disclosure is not limited to the audio device and may include various other devices. Further, there are no limits to the kind or number of pieces of information about the function module 13 in the table 81 shown in FIG. 8, and this information may be replaced by or added with different kinds of information.

The table 81 of the suitability reference information may be previously stored in the storage 24 of the electronic apparatus 1. According to another embodiment, the host device 21 may receive the table 81 of the suitability reference information from at least one of the plurality of function modules 13. In this case, the host device 21 may extract the table 81 from the module information received from the function module 13. According to still another embodiment, the host device 21 may download the table 81 of the suitability reference information from a server through the network. In this case, the host device 21 may transmit the identification information of the electronic apparatus 1 and/or the function module 13 to the server so as to specify the table 81 to be downloaded. Further, the host device 21 may extract the address information of the server, from which the table 81 is downloadable, from the module information received from the function module 13. Further, the host device 21 may specify the table 81 to be used, in response to a user's input. In this case, the host device 21 may display a graphic user interface (GUI) including a menu item for specifying the table 81, and receive a user's input through the displayed menu item. Accordingly, necessity for the electronic apparatus 1 to previously identify the function module 13 is relaxed, and it is thus easy to extend the function of the mountable function module 13 and improve compatibility with the function module 13.

Referring back to FIG. 7, at operation S73, the host device 21 identifies whether the corresponding function module 13 is suitable (hereinafter, referred to as 'suitability') based on the table 81 of the suitability reference information shown in FIG. 8. Specifically, the host device 21 may identify the suitability of the function module 13 based on whether the function modules 13 essentially required for a specific function are all mounted. Further, the host device 21 may identify compatibility between a device required by the host device 21 and the function module 13 or compatibility between the plurality of function modules 13, thereby identifying the suitability of the corresponding function module 13. For example, it will be assumed that the device essentially required for the specific function by the host device 21 is the audio amplifier "AMP1", and the block ID "ID1" of the function module 13 and the individual module ID "ID2" are respectively "AMP" and "1". In this case, the host device 21 identifies that the function of the function module 13 matches the device "AMP1" essentially required for the specific function by the host device 21, by referring to the information "Module" describing the function of the corresponding function module 13 tabulated in the table 81 of the suitability reference information. Therefore, the host device 21 may identify that the corresponding function module 13 is suitable.

Alternatively, when the device currently required by the host device 21 is a camera 'CAMERA1' and the block ID "ID1" of the function module 13 and the individual module ID "ID2" are respectively "AMP" and "1", the host device 21 identifies that the corresponding function module 13 does not match the device required by the host device 21. Therefore, in this case, the host device 21 may identify that the corresponding function module 13 is not suitable. The devices essentially required for the specific function in the host device 21 mentioned in the foregoing embodiment are not limited to these embodiments. When the corresponding function module 13 is not suitable, the host device 21 may continue to identify the suitability of another function module 13.

When it is identified in the operation S73 that the function module 13 is suitable, at operation S74 the host device 21 adds the corresponding function module 13 to a system configuration. That is, when all the function modules 13 essentially required for a specific function are mounted, the host device 21 controls the function modules to perform the specific function in the future. On the other hand, when it is identified in the operation S73 that the corresponding function module 13 is not suitable, the host device 21 does not add the corresponding function module 13 to the system configuration.

Referring back to FIG. 7, next, at operation S75, the host device 21 may inform a user of a result of identifying the suitability of the function module 13. FIG. 9 illustrates an example of suitability-identification result guide information according to an embodiment of the disclosure. For example, when it is identified that the corresponding function module 13 is suitable, the host device 21 may show a user a guide phrase 91 that the corresponding function module 13 was added to the system configuration. The guide phrase 91 may contain information showing the function (e.g. "audio amplifier") of the corresponding function module 13. On the other hand, when it is identified that the corresponding function module 13 is not suitable, the host device 21 may show a user a guide phrase 92 that the corresponding function module 13 was deleted from the system. The guide phrase 92 may contain information showing a reason why the corresponding function 13 is excluded (e.g. "incompatibility with the host or other function module"). Alternatively, when it is identified that the corresponding function module 13 is not suitable, the host device 21 may display a guide phrase 93 that contains information (e.g., "model name" and "model number") of the function module 13 corresponding to a device required by the host device 21 or a device compatible with the host device 21. Like this, when the function module 13 is mounted to the electronic apparatus 1, a user can more easily know whether the function module 13 is compatible with the electronic apparatus 1. Thus, user convenience is improved.

According to another embodiment, the host device 21 may check whether the plurality of mounted function modules 13 corresponds to combination of the preset function modules 13, thereby identifying the suitability of the corresponding function modules 13. For example, it will be assumed that the combination of the preset function modules 13 includes one audio input module "Audio IN", one analog-to-digital conversion module "ADC", one digital-to-analog conversion module "DAC", one audio amplification module "AMP", and one audio output module "Audio OUT". Further, it will be assumed that a first function module 13 having "Audio IN" and "1" as the block ID "ID1" and the individual module ID "ID2", a second function module 13 having "ADC" and "1", a third function module 13 having "AMP" and "1", and a fourth function module 13 having "Audio OUT" and "1" are mounted. In this case, the host device 21 may identify that the function modules 13 corresponding to the audio input module "Audio IN", the analog-to-digital conversion module "ADC", the audio amplification module "AMP", and the audio output module "Audio OUT" are suitable, but the function module 13 corresponding to the digital-to-analog conversion module "DAC" is not mounted yet, based on the table 81. In this case, the host device 21 may display a guide phrase 94 including information (e.g. "DAC") of the function module 13, which is required for a specific device or a specific function module (e.g. "FIRST FUNCTION MODULE": "ANALOG INPUT AMPLIFIER") of the host device 21 but not mounted yet. Thus, a user can easily know combination of the function modules 13, and understand matters needed for follow-up measures even when the combination of the mounted function modules 13 is abnormal. Accordingly, convenience for a user is further improved.

According to still another embodiment, the host device 21 may check priority among two or more same or similar function modules 13 and identify the suitability of the corresponding function modules 13. Referring back to FIG. 8, the table 81 of the suitability reference information shows priority "Priority" among two or more same or similar function modules 13. The priority "Priority" of the table 81 is assigned with ranking values "1, 2, . . . , n" in priority order from highest to lowest with respect to n function modules 13 according to blocks "Block". For example, it will be assumed that the first function module 13, of which the block ID "ID1" and the individual module ID "ID2" are respectively "AMP" and "1", and the second function module 13, of which the block ID "ID1" and the individual module ID "ID2" are respectively "AMP" and "2", are all mounted. In this case, the host device 21 checks that both the first function module 13 and the second function module 13 correspond to the "AMP" block "Block", the first function module 13 has a priority "Priority" of "1", and the second function module 13 has a priority "Priority" of "2". Therefore, the host device 21 may identify that the first function module 13 having higher priority than the second function module 13 is suitable, and the second function module 13 having lower priority is not suitable. In this case, when the host device 21 identifies that one (e.g. the "first function module") among the plurality of function modules 13 is suitable based on the priority and the others (e.g. the "function modules") are not suitable, a guide phrase 95 including information 95 about corresponding identification results may be shown to a user. The guide phrase 95 may include information about order of priority among the plurality of function modules 13 (e.g. "PERFORMANCE OF THE "FIRST FUNCTION MODULE">PERFORMANCE OF THE "SECOND FUNCTION MODULE"").

However, the foregoing embodiment is merely an example, and the disclosure is not limited to this embodiment. For example, it may be identified that one having the highest priority among three or more second function modules 13 is suitable, one having the specific priority (e.g. the second rank) among the plurality of second function modules 13 is suitable, or two or more second function modules 13 higher than the specific priority among the plurality of second function modules 13 are suitable. Alternatively, the function module 13 having a higher version between two or more function modules 13 different in version with regard to one function may be identified as that having the higher priority.

Referring back to FIG. 7, at operation S76, the host device 21 checks whether the suitability is completely identified with respect to all the function modules 13. When the suitability is not identified with respect to all the function modules 13 in the operation S76, the host device 21 performs the operation S71 again to identify the suitability of the next function module 13. On the other hand, when the suitability is completely identified with respect to all the function modules 13 in the operation S76, the host device 21 terminates operation.

The host device 21 performs operation based on the function of the function module 13 identified as suitable. The host device 21 may make a module driver of the function module 13 identified as suitable be installed in the electronic apparatus 1. The data and/or information needed for performing operation between the host device 21 and the function module 13 may be transmitted and received by the communication line 26 shown in FIG. 2. The host device 21 may specify the function module 13 based on the address information 53 included in the module information, and exchange data and/or information with the specified function module 13 by a communication method based on the communication method information 52. Therefore, various communication methods are possible between the host device 21 and the function module 13.

Figure 10:
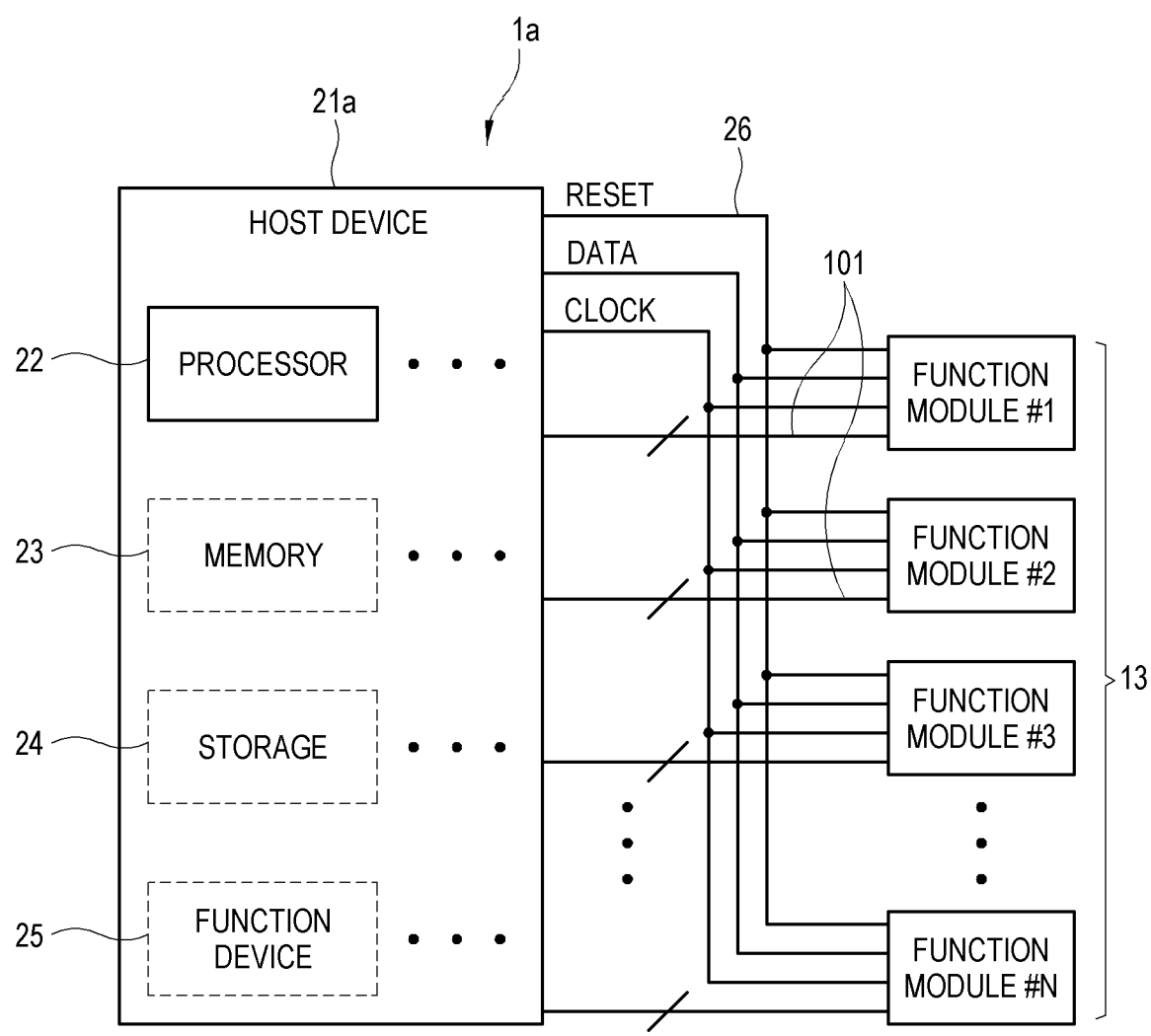
FIG. 10 is a block diagram of an electronic apparatus according to another embodiment of the disclosure.

The data and/or information needed for performing the specific function between the host device 21 and the function module 13 may be transmitted and received by a line other than the communication line 26 shown in FIG. 2. FIG. 10 is a block diagram of an electronic apparatus 1a according to another embodiment of the disclosure. Regarding the electronic apparatus 1a shown in FIG. 10, descriptions about the same or similar configuration to the electronic apparatus 1 described with reference to FIGS. 1 to 9 will be omitted. The electronic apparatus 1a shown in FIG. 10 additionally includes a communication line 101 between the host device 21 and the function module 13 independently of the communication line 26. The additional communication line 101 may for example be based on I$_2$C, UART, parallel communication, etc. The host device 21 specifies a method of communication with the function module 13 based on the module information received through the communication line 26, and exchanges data and/or information with the corresponding function module 13 through the additional communication line 1101. Therefore, communication is performed based on a communication method suitable for a situation by selecting one between the communication line 26 and the additional communication line 101.

Although a few exemplary embodiments have been described in detail, the disclosure is not limited to these embodiments and may be variously embodied within the appended claims.

We claim:

1. An electronic apparatus comprising:
   a plurality of connectors to which a plurality of function modules is mountable;
   a host device, and
   a bus line shared between the host device and the plurality of function modules mounted to the plurality of connectors,
   wherein the host device is configured to:
   make a request for information to the plurality of function modules mounted to the connectors in a lump through the bus line,
   based on the information received from the plurality of function modules, identify the plurality of function modules mounted to the connectors,
   identify whether the plurality of function modules corresponds to a combination of the function modules, the combination being defined for suitability of the plurality of function modules according to a function of the electronic apparatus, and
   control the function modules corresponding to the combination to perform the function.

2. The electronic apparatus according to claim 1, wherein the host device is configured to transmit a reset signal to the plurality of function modules, and receive the information from the function modules in sequence after a preset period of time elapses from transmitting the reset signal.

3. The electronic apparatus according to claim 1, wherein the host device is configured to identify that a function module having a higher version between two or more function modules different in version with regard to one function has higher priority.

4. The electronic apparatus according to claim 1, wherein the host device is configured to distinguish between the function modules based on a unique frequency of a communication signal assigned to each function module.

5. The electronic apparatus according to claim 1, wherein the host device is configured to identify the suitability based on the function and priority with reference to previously stored data.

6. The electronic apparatus according to claim 1, wherein the host device is configured to identify the suitability based on the function and priority with reference to data received from a server through a network.

7. The electronic apparatus according to claim 1, wherein the host device comprises a display, and is configured to control the display to display a guide message for informing that a function module is not mounted based on the function module essentially required for performing the specific function not being mounted.

8. The electronic apparatus according to claim 7, wherein the host device is configured to control the display to display a message related to at least one among whether the host device is compatible with the function module, whether the plurality of function modules are compatible with each other, and whether a plurality of mounted function modules corresponds to a combination of specific function modules.

9. The electronic apparatus according to claim 1, wherein the host device further comprises a communication line for exchanging data with the function module to perform the specific function.

10. A method of controlling an electronic apparatus, comprising:
    making a request for information to a plurality of function modules mounted to connectors in a lump through a bus line shared between the electronic apparatus and the plurality of function modules;
    based on the information received from the plurality of function modules, identifying the plurality of function modules mounted to the connectors;
    identifying whether the plurality of function modules corresponds to a combination of the function modules, the combination being defined for suitability of the plurality of function modules according to a function of the electronic apparatus; and
    controlling the function modules corresponding to the combination to perform the function.

11. The method according to claim 10, further comprising:
    transmitting a reset signal to the plurality of function modules; and receiving the information from the function modules in sequence after a preset period of time elapses from transmitting the reset signal.

12. The method according to claim 10, wherein the identifying of the suitability comprises identifying that a function module having a higher version between two or more function modules different in version with regard to one function has higher priority.

13. The method according to claim 10, further comprising distinguishing between the function modules based on a unique frequency of a communication signal assigned to each function module.

14. The method according to claim 10, wherein the identifying of the suitability comprises identifying the suitability based on the function and priority with reference to previously stored data.

15. The method according to claim 10, wherein the identifying of the suitability comprises identifying the suitability based on the function and priority with reference to data received from a server through a network.

16. The method according to claim 10, further comprising displaying a guide message for informing that a function module is not mounted based on the function module essentially required for performing the specific function not being mounted.

17. The method according to claim 16, further comprising displaying a message related to at least one among whether a host device is compatible with the function module, whether the plurality of function modules are compatible with each other, and whether a plurality of mounted function modules corresponds to a combination of specific function modules.

18. A non-transitory computer-readable recording medium storing a program, which when executed by an electronic apparatus, causes program control comprising:
   making a request for information to a plurality of function modules mounted to connectors in a lump through a bus line shared between the electronic apparatus and the plurality of function modules;
   based on the information received from the plurality of function modules, identifying the plurality of function modules mounted to the connectors;
   identifying whether the plurality of function modules corresponds to a combination of the function modules, the combination being defined for suitability of the plurality of function modules according to a function of the electronic apparatus; and
   controlling the function modules corresponding to the combination to perform the function.

* * * * *